Dec. 21, 1965
D. A. HAUSMANN
3,224,798
INTERNAL JOINT BAND FOR DOUBLE BELL CONCRETE PIPE
Filed Aug. 26, 1963
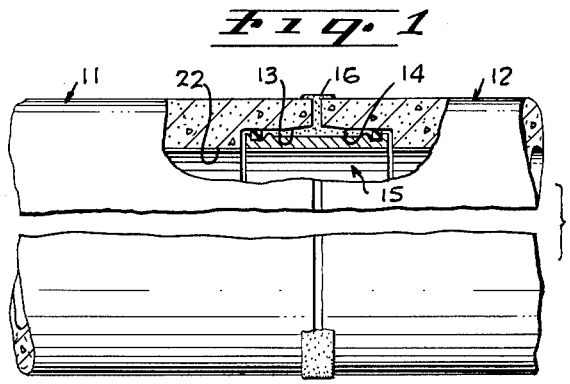
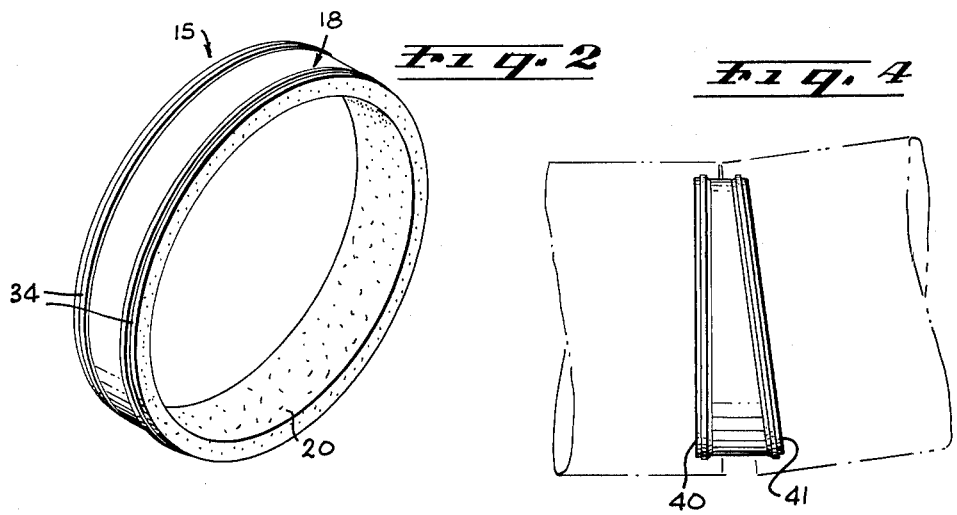
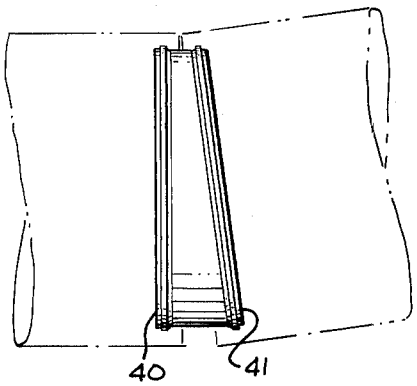
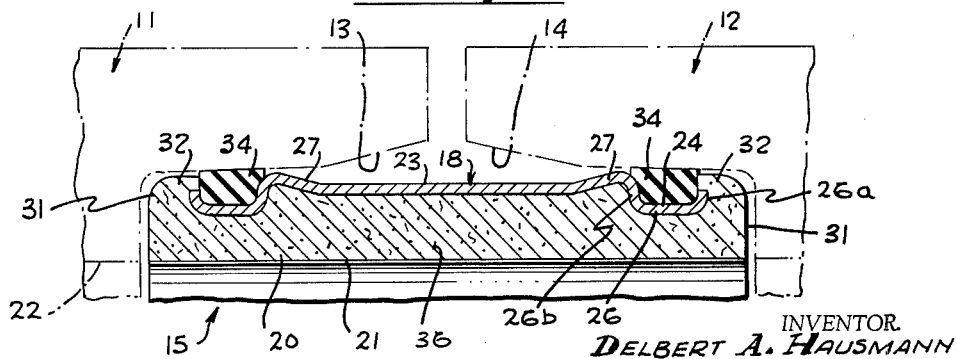
INVENTOR.
DELBERT A. HAUSMANN
BY
ATTORNEYS United States Patent Office 3,224,798
Patented Dec. 21, 1965

1

3,224,798
INTERNAL JOINT BAND FOR DOUBLE BELL
CONCRETE PIPE
Delbert A. Hausmann, Glendale, Calif., assignor to American Pipe and Construction Co., Monterey Park, Calif., a corporation of California
Filed Aug. 26, 1963, Ser. No. 304,566
2 Claims. (Cl. 285—288)

This invention has to do with internal bands for use in making up joints of bell-ended concrete pipe sections designed to withstand high internal pressures.

Internal joint bands are used in joining concrete pipe sections which have internally enlarged end portions or are belled at their ends. These bands extend axially into the adjacent ends of the pipe sections and are provided with two peripheral grooves to receive resilient seal rings of rubber or the like which engage the bell ends respectively of the pipe sections. Various constructions have been used for such joint bands and one such construction is shown in the copending application for patent of Delbert A. Hausmann and William Miller, entitled, Internal Joint Band, Serial No. 192,529, filed May 4, 1962, wherein the band includes a cylindrical steel collar provided with an internal body of cement mortar containing asbestos fibers with an impervious plastic membrane between the collar and body. The present application has to do with an improvement upon the joint band of said application.

An object of the invention is to provide an improved joint band ring of simple construction which can be readily manufactured economically at a cost less than the ring of said application.

More particularly it is an object to provide an internal joint band ring having a relatively thin rolled steel band provided with a lining of cement mortar body reinforced with asbestos fibers in which the seal ring-receiving peripheral grooves are defined substantially in their entirety by the steel band.

Another object is to provide a beveled internal joint band which is useful for forming a joint between pipe sections to achieve a change of direction in a pipe line by joining two adjacent sections of pipe at an angle of somewhat less than 180°.

These and other objects will be apparent from the drawing and the following description. Referring to the drawing:

FIG. 1 is a fragmentary view of the adjacent ends of two pipe sections broken away to expose a portion of the joint in section, and showing a joint band embodying the invention therein in the completed joint;

FIG. 2 is an isometric view of the internal joint band;

FIG. 3 is a cross sectional view through the joint band and a fragmentary sectional view of the pipe ends, but on a larger scale;

FIG. 4 is an elevational view of an alternate form of internal joint band.

More particularly describing the invention, numerals 11 and 12 designate two pipe sections of concrete which may be provided with suitable internal reinforcing (not shown) and these are provided at their ends with recessed inner surfaces 13 and 14 respectively to receive the internal joint band which is designated generally by numeral 15. Mortar 16 is used to complete the joint.

The band 15 comprises a steel band 18 and a body 20 of cement mortar bonded thereto and providing a cylindrical internal surface 21 which has the same diameter as the internal surface 22 of the pipe in which it is to be used.

The metal band 18 is formed of sheet or strip steel

2 which is rolled to the shape shown. This band has a main central section 23 which is preferably cylindrical and at each side thereof, a peripheral groove, designated 24. The grooves are defined by a channel-like section 26 which is connected to the main or central section 23 by a frusto-conical section 27. It will be noted that the outer wall portion 26a of the wall section 26 is of less diameter than the inner wall section 26b.

The body 20 of cement mortar is formed to extend beyond the ends of the metal band 18 and includes end sections 31 which overlie the short wall sections 26a in the region 32 and thus form a continuation of the inner surface of the section 23 and cooperate therewith to define the outer wall of the grove 24. Resilient rings 34 of rubber or of plastics are placed in these grooves when a joint is to be made up.

The body 20 is preferably reinforced by asbestos fibers 36 which are arranged at random throughout the body rather than being oriented in any particular manner. The fibers may vary in length. A particularly suitable composition for the body comprises about 60% Portland cement, about 30% plaster sand, and about 10% asbestos fibers, these being in terms of weight. As pointed out in the above-referred-to copending application, the material of the body 20 preferably is molded inside the metal band 18 by a process wherein a roller is used to compact the material and shape the inner surface of the body.

Referring now to FIG. 4, I show a joint band which differs from the band previously shown and described in that the edges 40 and 41 of the band are not disposed in parallel planes as are the end edges of the band shown in FIGS. 1-3. With this construction it is possible to utilize the joint band for joining pipe sections at a desired angle of several degrees less than 180°, and this eliminates the use of costly special pipe sections for this purpose.

The joint band described herein has several advantageous features. It requires no plastic membrane and only a relatively thin steel band, hence it is economical to manufacture. The shape and thickness of the band are such that ample space is provided between the band and the pipe sections to facilitate inspection after assembly of the joint, and subsequently to receive the grout which completes the joint and serves to support the joint band. Also, the design whereby the steel band extends axially sufficiently to provide the grooves for the seal rings makes the band less susceptible to damage than constructions which do not have this feature.

Although I have shown and described preferred forms of my invention, I contemplate that various changes and modifications can be made therein without departing from the invention, the scope of which is indicated by the following claims.

I claim:

1. An internal joint band for bell end concrete pipe, comprising a generally cylindrical rolled steel band having a cylindrical central section, and having a marginal channel section at each side thereof defining a peripheral groove, said channel sections being of U-shape and of less internal diameter than said central section, and a body of cement mortar bonded to the inner surface of said band, said body extending axially beyond and over the ends of said band to terminate in portions of greater diameter than the adjacent portions of the metal band, said steel band being provided with a frusto-conical section between ecah channel section and the central section, the diameter of said frusto-conical sections being greatest adjacent said channel sections whereby said cylindrical central section is recessed.

2. A device as defined in claim 1 wherein each end of the body lies in a single plane and the planes are at an angle to each other.

References Cited by the Examiner

UNITED STATES PATENTS

| | | | |
|---|---|---|---|
| 1,484,355 | 2/1924 | Moir | 285—370 |
| 1,913,779 | 6/1933 | Ukropina | 285—370 |
| 2,234,643 | 3/1941 | Grant | 285—269 |
| 2,416,618 | 2/1947 | Ferla | 285—288 |
| 2,896,976 | 6/1959 | Wiltse | 285—230 |
| 2,977,994 | 4/1961 | Xenis | 285—370 |

FOREIGN PATENTS

| | | |
|---|---|---|
| 546,131 | 10/1922 | France. |
| 61,645 | 12/1954 | France. |
| 731,165 | 6/1955 | Great Britain. |
| 489,453 | 1/1954 | Italy. |
| 500,445 | 11/1954 | Italy. |
| 597,839 | 9/1959 | Italy. |
| 341,364 | 11/1959 | Switzerland. |

CARL W. TOMLIN, *Primary Examiner.*

THOMAS F. CALLAGHAN, *Examiner.*